(12) United States Patent
Pivetta

(10) Patent No.: US 7,887,117 B2
(45) Date of Patent: Feb. 15, 2011

(54) DEVICE FOR OPENING AND CLOSING OF TARPAULINS FOR COVERING THE BODIES OF INDUSTRIAL, AGRICULTURAL AND SIMILAR VEHICLES

(75) Inventor: Cesarino Pivetta, Brugnera (IT)

(73) Assignee: Trakover SRL, Portogruaro, Venice (IT)

( * ) Notice: Subject to any disclaimer, the term of this patent is extended or adjusted under 35 U.S.C. 154(b) by 376 days.

(21) Appl. No.: 12/063,187

(22) PCT Filed: Aug. 4, 2006

(86) PCT No.: PCT/EP2006/065093

§ 371 (c)(1),
(2), (4) Date: Feb. 7, 2008

(87) PCT Pub. No.: WO2007/017480

PCT Pub. Date: Feb. 15, 2007

(65) Prior Publication Data

US 2009/0322116 A1 Dec. 31, 2009

(30) Foreign Application Priority Data

Aug. 9, 2005 (EP) .................................. 05107318

(51) Int. Cl.
*B60P 7/04* (2006.01)
(52) U.S. Cl. ................................. 296/100.13
(58) Field of Classification Search ................................. 296/100.11–100.18
See application file for complete search history.

(56) References Cited

U.S. PATENT DOCUMENTS

| | | | | |
|---|---|---|---|---|
| 3,201,171 A * | 8/1965 | Wickard | ................. | 296/100.15 |
| 3,688,787 A | 9/1972 | Feather | | |
| 3,820,840 A * | 6/1974 | Forsberg | ................. | 296/100.12 |
| 4,162,100 A * | 7/1979 | Muscillo | ................. | 296/100.12 |
| 4,210,361 A * | 7/1980 | Marvin et al. | ................ | 296/210 |
| 4,285,539 A * | 8/1981 | Cole | ............................ | 296/105 |
| 4,547,014 A * | 10/1985 | Wicker | ................... | 296/100.12 |
| 4,756,325 A * | 7/1988 | Daniels | .................... | 135/88.09 |
| 5,145,230 A * | 9/1992 | Biancale | ................. | 296/100.13 |
| 5,338,084 A * | 8/1994 | Wardell | ....................... | 296/105 |
| 5,427,428 A * | 6/1995 | Ericson et al. | ................. | 296/98 |
| 5,429,408 A | 7/1995 | Henning et al. | | |
| 5,524,953 A * | 6/1996 | Shaer | ..................... | 296/100.12 |
| 5,938,270 A * | 8/1999 | Swanson et al. | ........ | 296/100.11 |
| 6,142,554 A | 11/2000 | Carroll et al. | | |
| 6,312,040 B1 * | 11/2001 | Shinohara | .............. | 296/100.12 |
| 6,676,189 B2 | 1/2004 | Schall et al. | | |

(Continued)

FOREIGN PATENT DOCUMENTS

DE 202004018433 U1 3/2005

(Continued)

*Primary Examiner*—Glenn Dayoan
*Assistant Examiner*—Gregory Blankenship
(74) *Attorney, Agent, or Firm*—Stradley Ronon Stevens & Young, LLP

(57) ABSTRACT

Device for opening and closing control of tarpaulins for covering the bodies of industrial, agricultural and/or similar vehicles, in which the operating device 11 comprises drive pulleys 28 and diverter pulleys 26 which run along the cable 17. The operating device 11 is fixed on the first strut 21*a* and via its movement, controlled by the gear motor 13, closes or opens the tarpaulin on the body.

15 Claims, 4 Drawing Sheets

U.S. PATENT DOCUMENTS 7,140,665 B2 * 11/2006 Mirabella et al. ...... 296/100.11
2005/0212323 A1 * 9/2005 Marx et al. ............ 296/100.12
2009/0322116 A1 * 12/2009 Pivetta .................. 296/100.12

FOREIGN PATENT DOCUMENTS

EP 1228912 A2 8/2002
EP 1529671 A2 5/2005
WO WO96/33882 A1 10/1996

* cited by examiner

DEVICE FOR OPENING AND CLOSING OF TARPAULINS FOR COVERING THE BODIES OF INDUSTRIAL, AGRICULTURAL AND SIMILAR VEHICLES

The present invention concerns a device for controlling the opening and closing of tarpaulins for covering the bodies of industrial, agricultural and similar vehicles, said device permitting, via simple easy operations, the opening and closing of tarpaulins of vehicles requiring the use thereof.

The tarpaulins used for covering vehicle bodies are known to everyone, especially in the field of industrial vehicles, among others, said tarpaulins being necessary to protect, retain and therefore prevent outflow of the materials transported. Think, for example, of the transport of sand, gravel or similar materials, the components of which are very lightweight and sensitive to air flows and can therefore be removed from their position on the body and dispersed by the turbulence generated by the air resistant to the forward movement of the vehicle, with consequent fallout of said materials onto the vehicles behind, all this generating considerable inconvenience in driving and also the risk of accidents caused by poor visibility, or even by breakage of the windscreens of the vehicles following the above-mentioned means of transport, in addition to other drawbacks such as dirtying of the roads and environmental pollution.

Various solutions of known type exist for said purpose in the field of covers for vehicle bodies for a wide range of different uses.

Said solutions are achieved using complex means and methods which are very expensive and have to be produced each time according to the dimensions of the type of body to be covered and involve lengthy procedures and difficult operations for application with consequent considerable expenditure in terms of working hours.

Said solutions provide for complicated systems, consisting for example of systems of shafts for transmission of the movement to the struts supporting the covering tarpaulin. Said shafts are also provided with bevel gear pairs for transmission of their rotary movement to the corners of said bodies where other shafts are located which must also be rotated. They require reducers for transmission of the movement in order to permit reduction of the force to be applied to move everything. Furthermore said systems, since they are very heavy and have considerable friction, are not easy to operate manually, even though provided with reducer, and require auxiliary drive means such as electric motors or other alternative means intended for said purpose.

The patent application ITPN20010008 (EP-A-EP1228912) describes a system for the opening and closing of tarpaulins for covering vehicles, comprising a cable that runs along pulleys moved by a bevel gear pair. This embodiment has partly solved the above-mentioned problems, envisaging a device for control of opening and closing of tarpaulins for covering bodies of industrial, agricultural and similar vehicles consisting of a telescopic tubular element in which a bevel gear pair is positioned which moves vertical pulleys at the front corners of the body and rear pulleys after a passage through other horizontal front pulleys. The embodiment is complicated, however, both from the construction point of view, as it has many moving parts that are machined and are therefore costly, and from the functional point of view since the multiplicity of the moving parts requires frequent checking and costly maintenance.

Furthermore the embodiments prior to the present invention do not adapt to the different body sizes, and this involves additional expenses for manufacturing and storage of different types of covers for different customers. The systems with bevel gear pair and pulleys are fixed to the body and this complicates matters in terms of production due to the fact that special fabricated reinforcement structures must be provided on the body at the level of said devices for subsequent assembly with consequent problems of complex and costly production.

Furthermore the known systems do not guarantee, in harsh building site conditions, for example, uniform distribution on both sides of the body of the forces of the cable on the cover during operation with the result that at times the system does not work due to the fact that on one side the tarpaulin is stretched more than on the other until the cover becomes jammed or even breaks.

The cables of the known systems and the moving parts require frequent maintenance and cleaning to prevent damage to the bevel gear pair-pulley system, and removal of the device for periodic maintenance at the factory and subsequent refitting are time-consuming.

DESCRIPTION OF THE INVENTION

The aim of the present invention is therefore to remedy the above problems and to provide an opening and closing control device for opening and closing tarpaulins covering industrial, agricultural and similar vehicles which provides for reduced subsequent intervention in terms of fabrication work on the body for fitting of said device, symmetrical distribution of the tension of the supporting cable on both sides of the vehicle, realignment of the struts at stroke end, safe stable sliding inside the guide pulleys, very little maintenance on the moving parts and quick assembly and disassembly.

A system that meets said requirements is defined by a device for covering the bodies of industrial, agricultural and/or similar vehicles comprising cables arranged respectively one on each side along the upper edges of the sideboards of the body of a related vehicle, struts on which a tarpaulin is fixed, and an operating device, one for each side, for closing and opening said tarpaulin which runs along the related cable, characterised in that said operating device is fitted on said device for the opening and closing control of tarpaulins.

Preferably said operating device is fitted on the first strut positioned towards the tailboard of the body.

It can comprise a drive pulley operated by a gear motor and at least two diverter pulleys on the same plane as said drive pulley, said drive pulley gripping said cable.

According to a preferred embodiment of the invention the device for covering the bodies of industrial vehicles is characterised in that the rotation axis of said drive pulley is parallel to but not on the same plane as the surface containing the axes of said diverter pulleys, so that said cable is diverted with respect to its axis while it runs relatively along said drive pulley and preferably the angle ($\alpha$) of deviation is between 10° and 120°, preferably between 30° and 80°.

The drive pulley of said operating device can have a race with trapezoidal section along which said cable with diameter (D) runs, the angle ($\beta$) formed by the corners of said trapezoidal section with small base (g) being such that the point of contact between said cable and said drive pulley is shifted with respect to the axis of symmetry of said cable by a distance (d), and the ratio $g:D:d=0.4-0.6:1:0.15-0.2$.

Analogously the diverter pulleys can have a race with section generically semicircular or similar, the width of the section of the race being significantly slightly larger than the diameter of the cross section of said cable.

The struts of said device for covering the bodies of industrial, agricultural and similar vehicles can be connected to each other via ribs of semi-rigid material, preferably plastic material, more preferably polyethylene: said ribs can be hollow, preferably with tubular section, inside which electrical cables run for powering said gear motor.

The cables can be fitted individually stretched along the sideboards of the body by means of screw systems, or by means of a winch preferably positioned on the front board of the body; if there is one single cable and it starts from a rear end of a sideboard of the body, it runs along the front board of the body until it reaches the other sideboard of said body, following a U-shaped path.

DETAILED DESCRIPTION OF THE FIGURES

Figure 1:
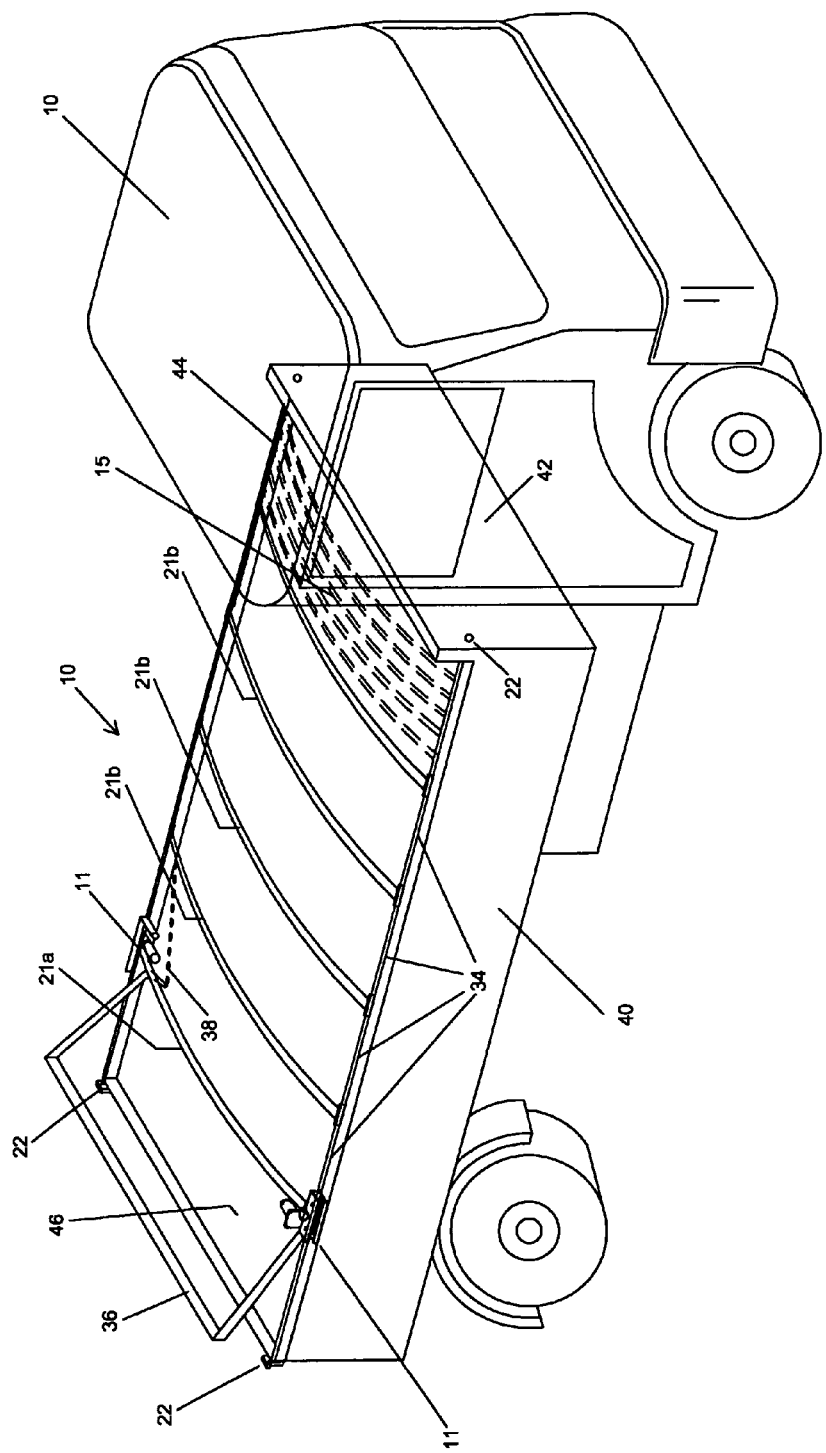
FIG. 1 illustrates in a perspective view the device in question applied to the body of a generic vehicle with some parts indicated by a fine line to facilitate comprehension.
Figure 2:
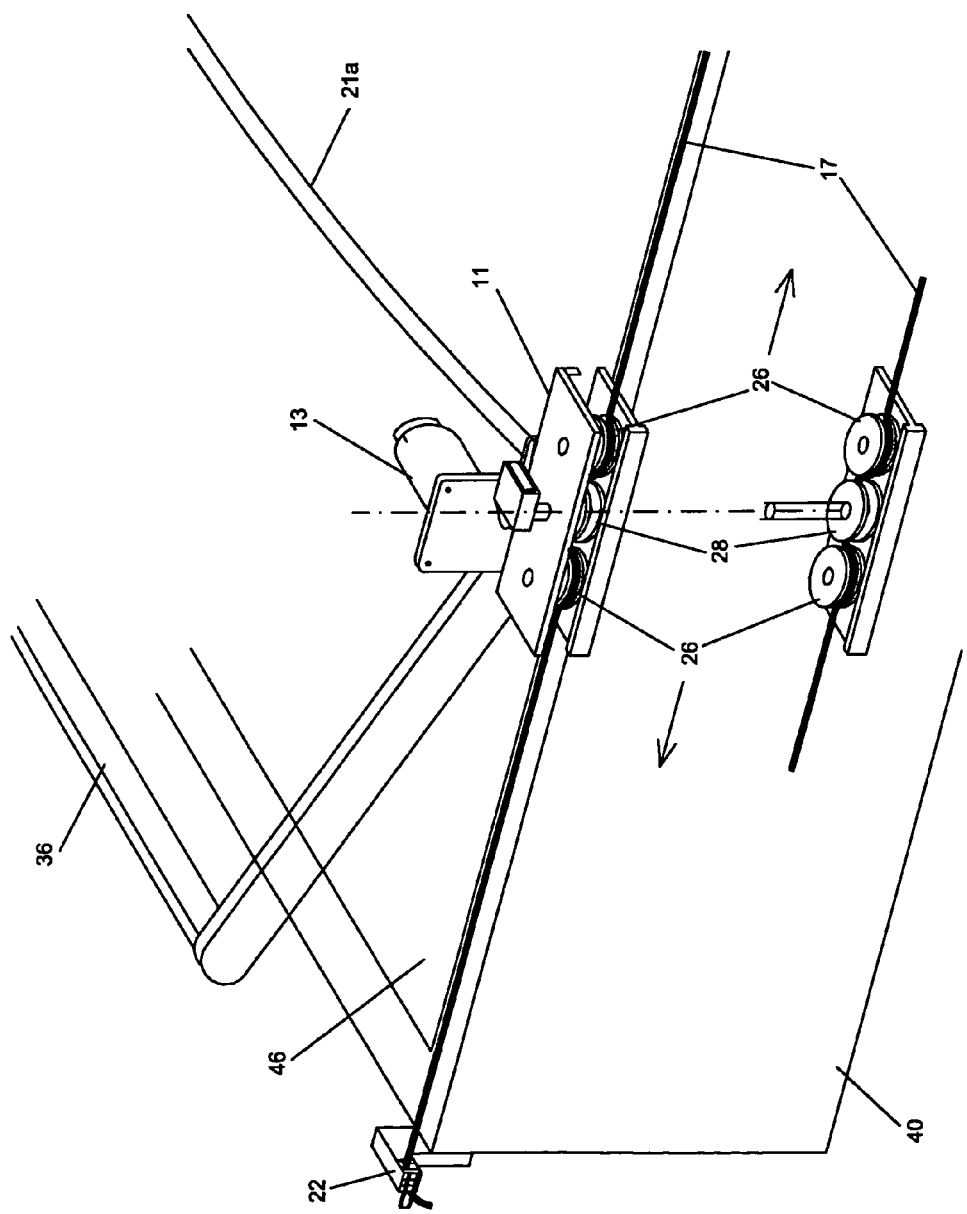
FIG. 2 shows the tarpaulin operating device.

The device 10 for controlling opening and closing of tarpaulins for covering the bodies of industrial, agricultural and/or similar vehicles is described here applied to the body 20 of the industrial vehicle shown in fine outline. The body 20 is partly covered by the tarpaulin 15 reinforced by the cross struts 21b. The operating device 11 is fixed at the level of the first cross strut 21a, and is positioned on both sides of the body. The operating device 11, comprising the gear motor 13, runs along the cable 17 (FIG. 2). Each cable 17 on the right and left side of the body is pulled taut between the front and rear ends of the sideboards of the body, as can be seen in FIG. 1. For tightening the cable 17 a hook-screw tensioning system 22 can be used at the ends of the cable 17 with very easy operation or one single cable can be positioned starting from a rear end of the body and running along the front wall of the body until it reaches the other rear end of the body, following a U-shaped path. At the level of the front wall of the body a winch can be positioned (not shown in the figures) which tensions the two cables simultaneously. This solution has the characteristic of tightening the two longitudinal sections of cable with the same tension.

The tarpaulin 15 is supported by the strut 21a and the struts 21b substantially identical to each other which can consist of telescopically adjustable tubular elements. They can consist fundamentally of a central part formed of a section of suitable metallic tube appropriately bent so that the resulting strut (21a-21b) forms a relative supporting wall for the tarpaulin 15 which is arched upwards. In the ends of the tubular section forming said central part respective tubular sections with an external diameter equal to the internal diameter of the latter can be inserted resulting furthermore bent in the same way so that they can run freely in it. This means that the length of the struts 21a and 21b can vary thus adapting to the different widths of the various bodies on which the related device subject of the present invention is applied. The final length can be fixed by means of suitable screws, rivets or similar.

The struts 21a and 21b can also consist of one single tube or analogous section bar.

The struts are connected to each other by stiffening ribs 34 made of flexible material.

On the first strut 21°, positioned towards the tailboard of the body, the operating device 11 is fixed which, moving along the cable 17 between the front and rear end of the body, will pull the tarpaulin 15 covering it or, vice versa, will push it towards the front wall of the body, thus uncovering it to free the body from the protection of the tarpaulin.

The operating device 11 with the gear motor 13 is therefore part of the tarpaulin and is not fixed, as in the known technique, on the body.

Note the absence with respect to the known technique of complex mechanical devices such as bevel gear pairs fixed on the sides of the body and related fabricated metal reinforcements.

Figure 3:
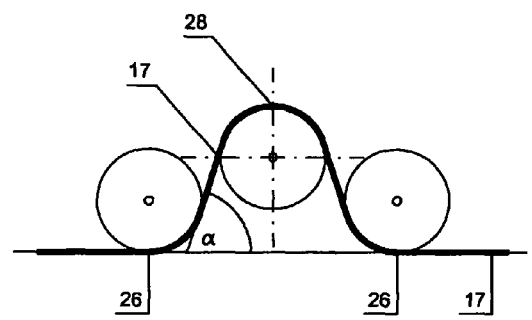
FIG. 3 shows a detail of the tarpaulin operating device.

The gear motor 13 transmits the movement to the central drive pulley 28; the cable 17 is arranged, as can be seen better in FIG. 3, between the idle diverter pulleys 26 which have the function of increasing the contact surface between the central drive pulley 28 and the cable 17 so that the friction between the two components is sufficient to guarantee movement of the operating device 11 along the cable 17 and consequently guarantee covering of the body with the tarpaulin 15 or, vice versa, opening thereof by folding the tarpaulin back completely to the front wall of the body.

As it runs along the cable 17 the operating device 11 keeps the cable 17 clean, preventing failures due to dirt accumulating in the cable.

The rotation axis of the drive pulley 28 is parallel to but not on the same plane as the surface containing the axes of the diverter pulleys 26, so that the cable 17 is diverted with respect to its axis while it runs relatively through the drive pulley 28.

The geometry of the arrangement of the three pulleys 26, 28 therefore determines the angle $\alpha$ (FIG. 3) described by the cable 17 running between the pulleys. Said angle is chosen at the design stage with values preferably between 10 and 120 degrees, even more preferably between 30 and 80 degrees.

Figure 4:
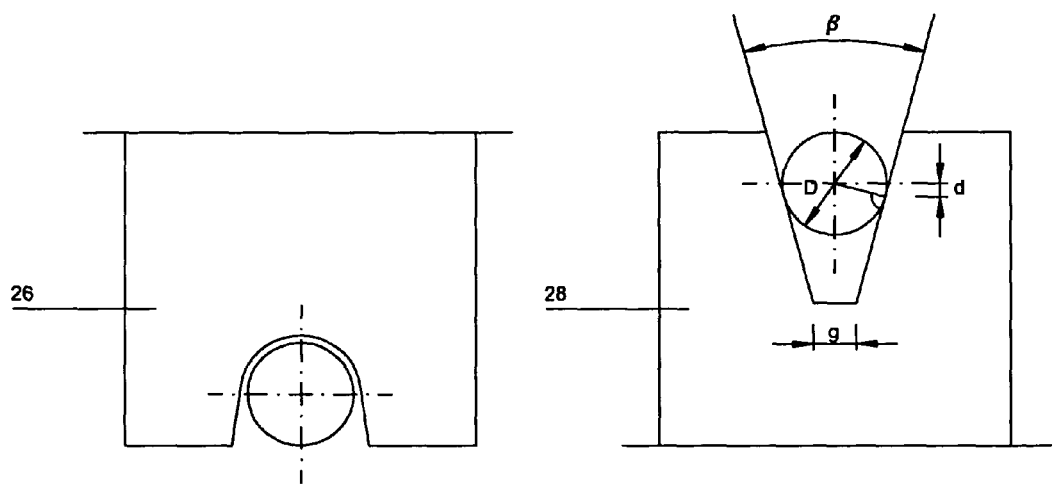
FIG. 4 shows a detail of the drive pulley of the tarpaulin operating device and diverter pulley.
Figure 5:
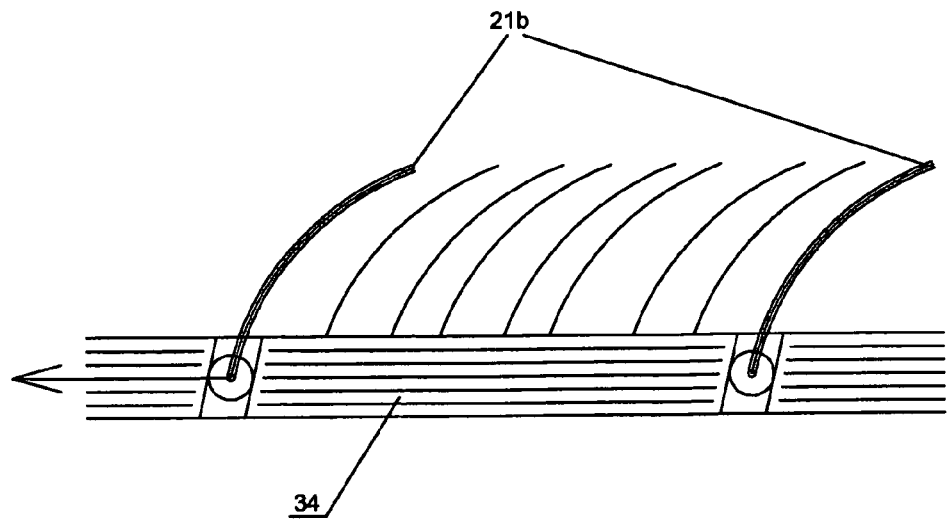
FIG. 5 shows a detail of the struts of the tarpaulin.

In order to guarantee the friction between the cable 17 and the drive pulley 28, the race of said drive pulley 28 (FIG. 4) has a trapezoidal section with small base (g) in which the angle $\beta$ formed by the sides of the trapezium of the trapezoidal section is chosen so that the point of contact between cable 17 with diameter (D) and drive pulley 28 is shifted towards the inside of the race with respect to the axis of symmetry of the cable 17 by a distance (d) and the ratio g:D:d=0.4-0.6:1:0.15-0.2.

This guarantees, simultaneously, good friction and relative low wear between the contact walls of the two components. As a non-limiting example, for a cable 17 with diameter of 6 mm the deviation envisaged is in the order of 1 mm for a small base of 3 mm.

Since the diverter pulleys 26 have to produce as little friction as possible, the slot of the seat on which the cable 17 runs will not be in trapezoidal section but generically semicircular. The race must not be too large with respect to the diameter of the cable so that the latter is not excessively crushed but rests against the side walls of the race.

Figure 6:
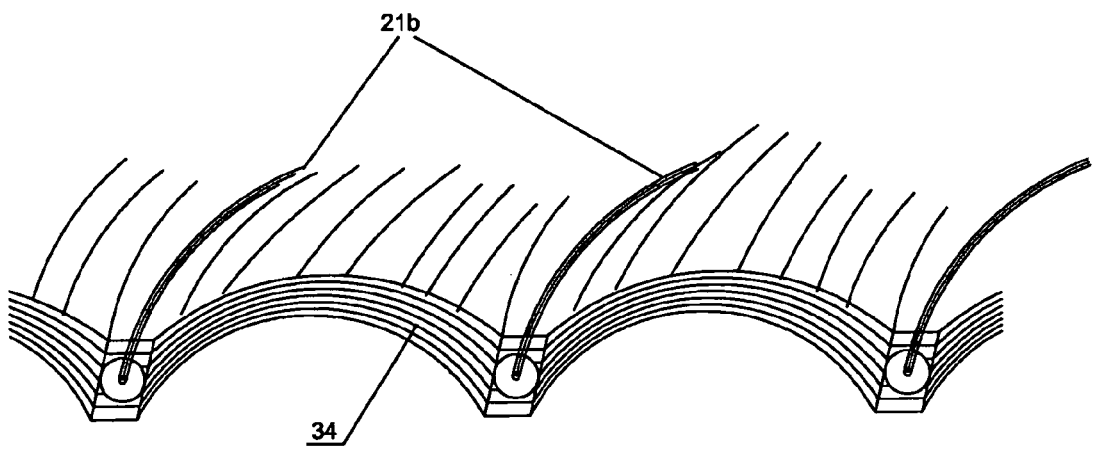
FIG. 6 shows a detail of the struts of the tarpaulin when folded back.

The struts 21a and 21b are interconnected via the ribs 34 made of semi-rigid material, preferably polyethylene. They have the function of stiffening the structure and, during pulling, of distributing the traction force between the struts, while during pushing, that of guiding correct positioning of the tarpaulin as it is folded accordion-fashion (FIG. 6). The ribs 34 are preferably entirely or partially hollow with respect to the section and inside them the electrical cables for operation of the gear motor 13 can run. This ensures correct protection of the electrical cables.

As can be seen in FIG. 1 the tarpaulin 15 terminates in the rear part with an end flap 36 which has the purpose of "sealing" the tarpaulin also at the level of the tailboard of the body.

When the operating device 11 arrives at stroke end at the level of the screw system 22, the end flap 36 flips up vertically and is positioned against the rear wall of the body. The mechanism for said flip-up movement can vary: it is possible to provide an arm on the end flap connected to a chain which is tensioned when the operating device 11 arrives at stroke end, forcing the end flap into a vertical position against the rear wall of the body.

From the above description it is evident that the device in question consists of very simple elements which are readily available on the market, easy to assemble and install, adaptable to any type of body of industrial, agricultural or other type of vehicle, and with few moving parts.

Furthermore all the elements are produced so that they can be offered to the public in an "assembly kit" form, in order to limit installation costs since installation can be performed simply and therefore directly even by non-qualified personnel, also without requiring special tools available only in specialised workshops.

The present invention offers many advantages with respect to the known analogous devices:

quick assembly and disassembly;
possibility of complete repair of the device including the operating device, which in the known art is fixed on the body, by completely disassembling it and sending it to a maintenance workshop;
no size limitations on the body;
no need to provide for special laborious fabrication work for fixing control elements on the body;
cleaning of the metal traction cable as it runs through the pulleys.

It is evident that different variations can be made to the device forming the subject of the present invention without departing from the scope of what is described here and claimed below with reference to the attached drawings and therefore without departing from the protection of the present industrial patent right.

The invention claimed is:

1. A covering device for a body of an industrial or an agricultural vehicle, the covering device comprising one or more cables arranged on respective sides of the vehicle, along upper edges of sideboards of a body of the vehicle, struts on which a tarpaulin is fixed, and operating devices, one for each side of the vehicle, for closing and opening said tarpaulin, wherein each of the operating devices runs along a related one of the one or more cables, and each of said operating devices is fitted on a first strut positioned proximate a tailboard of said body and comprises a drive pulley operated by a gear motor, and at least two diverter pulleys located on a same plane as said drive pulley, said drive pulley gripping the related one of said one or more cables.

2. The covering device for a body of an industrial or an agricultural vehicle as claimed in claim 1, wherein an axis of rotation of said drive pulley of each of the operating devices is parallel to but not on a same plane as a surface containing the axes of said diverter pulleys of the operating device, so that the related one of said one or more cables is diverted with respect to an axis of the related one of said one or more cables while the related one of said one or more cables runs relatively along said drive pulley.

3. The covering device for a body of an industrial or an agricultural vehicle as claimed in claim 2, wherein:

an angle ($\alpha$) of deviation is defined between (i) a portion of each of the one or more cables extending between the drive pulley and one of the diverter pulleys of the related operating device and (ii) a general direction of travel of the operating device, and the angle ($\alpha$) of deviation is between 10° and 120°.

4. The covering device for a body of an industrial or an agricultural vehicle as claimed in claim 1, wherein: each of the one or more cables has a diameter (D); each of said drive pulleys has a race with a trapezoidal section and a small base (g) along which the related one of said one or more cables runs; an angle ($\beta$) formed by the corners of said trapezoidal section being such that in the trapezoidal section, the point of contact between said related one of said one or more cables and said drive pulley is shifted towards an inside with respect to an axis of symmetry of said related one of said one or more cables by a distance (d), and a ratio g:D:d=0.4-0.6:1:0.15-0.2.

5. The covering device for a body of an industrial or an agricultural vehicle as claimed in claim 4, wherein said diverter pulleys each have a race with a generically semicircular section or similar, the width of the section of the race being slightly larger than the diameter (D) of said cables so that each of the one or more cables rest against the side wall of the race of the related diverter pulley and the one or more cables are not excessively crushed by the diverter pulleys.

6. The covering device for a body of an industrial or an agricultural vehicle as claimed in claim 1, wherein said struts are connected to each other via ribs made of semi-rigid material.

7. The covering device for a body of an industrial or an agricultural vehicle as claimed in claim 6, wherein said ribs are entirely or partially hollow.

8. The covering device for a body of an industrial or an agricultural vehicle as claimed in claim 1, wherein said one or more cables are individually stretched along said sideboards of said body by means of hook-screw systems or a winch.

9. The covering device for a body of an industrial or an agricultural vehicle as claimed in claim 3, wherein the angle ($\alpha$) of deviation is between 30° and 80°.

10. The covering device for a body of an industrial or an agricultural vehicle as claimed in claim 4, wherein the ratio g:D:d=0.5:1:⅙.

11. The covering device for a body of an industrial or an agricultural vehicle as claimed in claim 6, wherein the ribs are made of a plastic material.

12. The covering device for a body of an industrial, or an agricultural vehicle as claimed in claim 6, wherein the ribs are made of polyethylene.

13. The covering device for a body of an industrial or an agricultural vehicle as claimed in claim 8, wherein said winch is positioned on a front board of said body.

14. The covering device for a body of an industrial or an agricultural vehicle as claimed in claim 8, wherein the one or more cables is one single cable, and the single cable follows a U-shaped path that starts from a rearward end of one of the sideboards of the body and runs along a front board of said body until the single cable reaches the other of the sideboards of the body.

15. The covering device for a body of an industrial or an agricultural vehicle as claimed in claim 7, wherein the ribs are tubular and electrical cables for powering gear motors of the operating devices are run inside of the ribs.

* * * * *